(12) United States Patent
Wenke et al.

(10) Patent No.: US 10,401,827 B2
(45) Date of Patent: Sep. 3, 2019

(54) METHOD AND DEVICE FOR MACHINING A TOOL BY REMOVING MATERIAL

(71) Applicant: Walter Maschinenbau GmbH, Tübingen (DE)

(72) Inventors: Oliver Wenke, Neustadt (DE); Manfred Maier, Ammerbuch (DE); Christoph Plüss, Burgdorf (DE)

(73) Assignee: Walter Maschinenbau GmbH, Tübingen (DE)

( * ) Notice: Subject to any disclaimer, the term of this patent is extended or adjusted under 35 U.S.C. 154(b) by 18 days.

(21) Appl. No.: 15/568,204

(22) PCT Filed: Apr. 8, 2016

(86) PCT No.: PCT/EP2016/057685
§ 371 (c)(1),
(2) Date: Oct. 20, 2017

(87) PCT Pub. No.: WO2016/169782
PCT Pub. Date: Oct. 27, 2016

(65) Prior Publication Data
US 2018/0143611 A1    May 24, 2018

(30) Foreign Application Priority Data
Apr. 20, 2015   (DE) .................. 10 2015 105 999

(51) Int. Cl.
*B23Q 17/09*   (2006.01)
*B23Q 17/24*   (2006.01)
(Continued)

(52) U.S. Cl.
CPC ....... *G05B 19/402* (2013.01); *B23Q 17/0919* (2013.01); *B23Q 17/249* (2013.01);
(Continued)

(58) Field of Classification Search
None
See application file for complete search history.

(56) References Cited

U.S. PATENT DOCUMENTS

| 2004/0083024 A1 | 4/2004 | Wang |
| 2007/0124015 A1 | 5/2007 | Chen et al. |

(Continued)

FOREIGN PATENT DOCUMENTS

| CN | 101246506 A | 8/2008 |
| CN | 102901443 A | 1/2010 |

(Continued)

OTHER PUBLICATIONS

International Search Report in corresponding International Application No. PCT/EP2016/057685, dated Jul. 6, 2016, 15 pages.

(Continued)

*Primary Examiner* — Ryan A Jarrett
(74) *Attorney, Agent, or Firm* — Fitch, Even, Tabin & Flannery LLP

(57) ABSTRACT

The invention relates to a device (15) and a method (V) for machining a tool (16) by removing material. The tool (16) is first of all measured in three dimensions using a measuring unit (17) and a three-dimensional virtual tool model (M) is produced therefrom. This virtual tool model (M) is compared with a reference contour (R) from a particular tool data record (WD). If a match was determined, a machining program (PR) assigned to the tool data record (WD) is selected and a desired contour (SK) is determined by fitting the reference contour (R) into the three-dimensional virtual tool model (M). The tool (16) can then be machined on the basis of this desired contour (SK).

16 Claims, 6 Drawing Sheets

(51) Int. Cl.
*G01B 11/24* (2006.01)
*G01B 11/25* (2006.01)
*G05B 19/402* (2006.01)
*G05B 19/4065* (2006.01)
*G05B 19/4093* (2006.01)

(52) U.S. Cl.
CPC ...... *G01B 11/2518* (2013.01); *G05B 19/4065* (2013.01); *G05B 19/40937* (2013.01); *B23Q 2717/00* (2013.01); *G01B 11/24* (2013.01); *G05B 2219/35519* (2013.01); *G05B 2219/50214* (2013.01); *Y02P 90/265* (2015.11)

(56) References Cited

U.S. PATENT DOCUMENTS

| | | | |
|---|---|---|---|
| 2008/0148590 | A1 | 6/2008 | Hayashi et al. |
| 2014/0316573 | A1 | 10/2014 | Iwatake |
| 2015/0028007 | A1 | 1/2015 | Plüss et al. |
| 2015/0151493 | A1* | 6/2015 | Schmidt ................ B29C 64/40 700/98 |
| 2018/0143611 | A1* | 5/2018 | Wenke ............... B23Q 17/0919 |

FOREIGN PATENT DOCUMENTS

| | | |
|---|---|---|
| CN | 102581700 A | 7/2012 |
| CN | 103586740 A | 2/2014 |
| DE | 4026942 A1 | 2/1992 |
| DE | 102009030644 A1 | 12/2010 |
| DE | 102012106139 A1 | 1/2014 |
| DE | 102012106193 A1 | 1/2014 |
| DE | 102014005758 A1 | 10/2014 |
| EP | 1792687 A1 | 6/2007 |
| JP | S54-152281 A | 11/1979 |
| JP | H09-081221 A | 3/1997 |
| JP | 2001-022422 A | 1/2001 |
| JP | 2001-522727 A | 11/2001 |
| JP | 2004-066354 A | 3/2004 |
| JP | 2004-144091 A | 5/2004 |
| JP | 2004-322287 A | 11/2004 |
| JP | 2008-062369 A | 3/2008 |
| JP | 2008-196989 A | 8/2008 |
| JP | 2010-513927 A | 4/2010 |
| JP | 2010-120104 A | 6/2010 |
| JP | 2012-168186 A | 9/2012 |
| JP | 2014-530771 A | 11/2014 |

OTHER PUBLICATIONS

Office action in corresponding German Application No. DE 102015 105 999.1, dated May 20, 2016, 7 pages.
Japanese office action in corresponding Japanese Application No. 2017-554558 dated Oct. 30, 2018, with English translation, 6 pages.
Chinese office action in corresponding Chinese Application No. 201680022811.9 dated Nov. 1, 2018, with English translation, 30 pages.

* cited by examiner

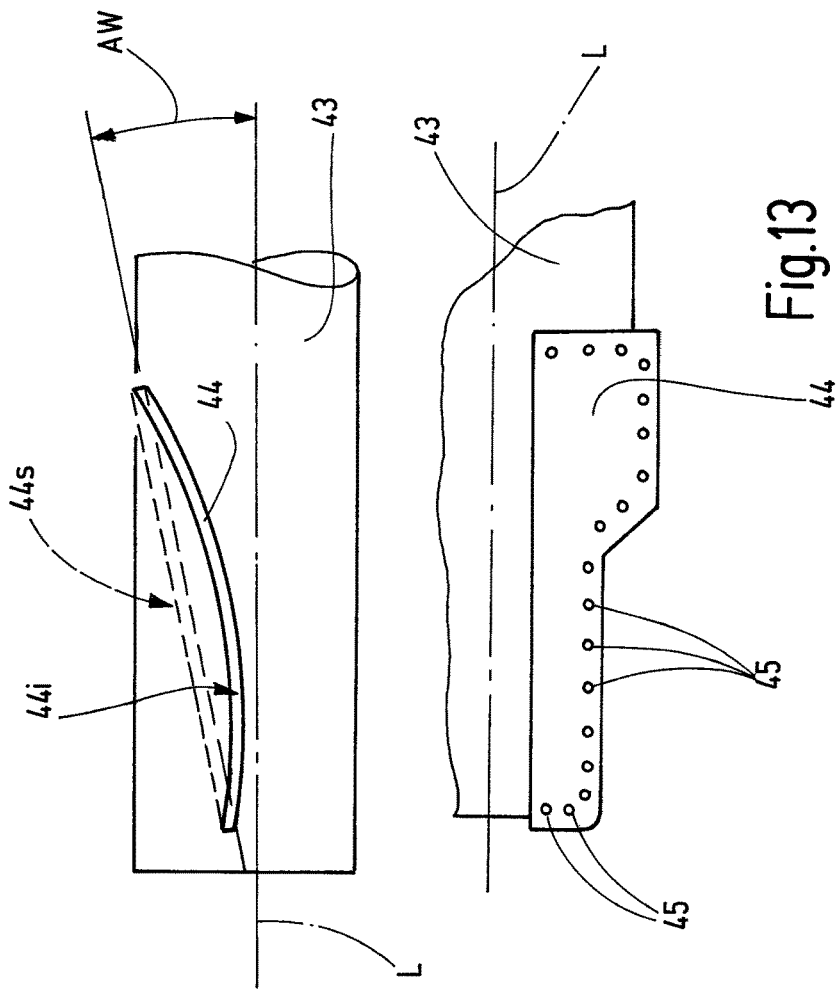
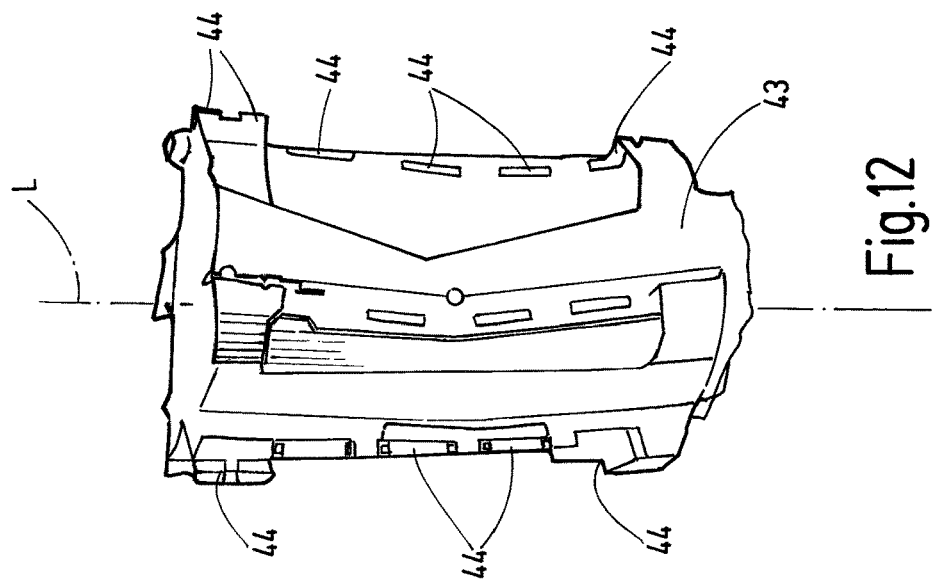

METHOD AND DEVICE FOR MACHINING A TOOL BY REMOVING MATERIAL

CROSS REFERENCE TO RELATED APPLICATIONS

This patent application is the national phase of PCT/EP2016/057685 filed Apr. 8, 2016, which claims the benefit of German Patent Application No. 10 2015 105 999.1 filed Apr. 20, 2015.

TECHNICAL FIELD

The invention relates to a method, as well as to a device, for machining a tool by removing material. The measurement of the dimensions of tools is of importance during the fabrication of new tools or during the reworking of used tools that have already been subject to a certain amount of wear. For quality control, for example, measurements are performed in order to check whether the tool and its characteristics, respectively, are still within a specified tolerance range. The characteristics to be specifically determined and checked depend on the individual type of tool. For example, in the case of cutting tools that rotate about their longitudinal axis, the parameters such as cutting angle, clearance angle, angular pitch between blades that are adjacent in circumferential direction, the length of the tool, the core diameter, the angle of twist or the angular momentum increase or any combination thereof can be assessed and verified.

BACKGROUND

Different measuring methods and measuring machines have been known, wherein a tool can be assessed in a contactless manner and/or by mechanical contact sensing, and wherein the characteristics can be measured or mathematically determined. However, these methods are highly complex so that they are used during the manufacture of new tools and also during the reworking process only if this is required, in particular, to keep the amount of time used as minimal as possible.

Publication DE 10 2012 106 193 A1 describes a method for the determination of material wear in a machine tool for the geometrically defined chip removal. There, the wear of a tool is detected with an optical recording device. The resultant actual condition of the tool is compared with a specified desired condition and, based on this, a wear value is determined. With the use of the wear value, it is then possible to change the movement of the tool in the machining device, so that the desired removal of material from a workpiece is achieved.

SUMMARY

The object of the invention can be viewed as providing a method or a device with which a manufacture of a tool or a subsequent reworking of a tool can be optimized.

The invention provides that first the three dimensions of a tool are measured and, based on this, a three-dimensional virtual tool model is generated. The three-dimensional measurement can be performed by a 3D scanner, for example a laser scanner, or another suitable 3D measuring device. The 3D measuring unit generates measured data, in particular in the form of a dot cloud that describes the edges and surfaces of the measured tool. The dot cloud may represent the virtual tool model. However, it is also possible to partially or completely process the dot cloud by means of processing operations. For example, by forming loops or a grid model and by texturing the loops or the grid model, it is possible to generate a virtual tool model from the dot cloud, said tool model being easier to depict. Furthermore, for visualization, it is possible to generate a planar tool model from the dot cloud. Furthermore, it is possible to process the dot cloud with known algorithms or mathematical processes and to eliminate unnecessary dots of the dot cloud and/or obvious error dots.

After generating the three-dimensional virtual tool model, it can be used to determine—in one advantageous embodiment—at least one model parameter characterizing the measured tool. The determination of the model parameter is optional.

The three-dimensional virtual tool model and/or the at least one determined model parameter are compared with stored tool data sets. Each tool data set is allocated one process program, respectively, for machining by removing material.

Due to the comparison, the tool data set is selected from existing tool data sets, said data set corresponding to the three-dimensional virtual tool model. If a match between a tool data set and the three-dimensional tool model can be determined, a corresponding tool data set is generated and subsequently selected.

Preferably, the tool data set contains a reference contour and/or at least one tool parameter. The contour of the three-dimensional virtual tool model or the model parameter determined based thereon is compared with the reference contour of the tool data set and/or with the tool parameter of the tool data set. If the three-dimensional virtual tool model corresponds to the reference contour within specified tolerances and/or if the determined model parameters and the stored tool parameters correspond to each other, there is determined a match of the three-dimensional virtual tool model and the tool data set.

A desired tool contour is generated with the use of the reference contour of the selected tool data set. This is accomplished in that the reference contour is fitted into the three-dimensional virtual tool model. Fitting is accomplished in that the reference contour does not project from the contour described by the three-dimensional virtual tool model at any point of the tool that is to be machined. In doing so, fitting of the reference contour is accomplished under the marginal condition that the amount of removed material is as minimal as possible. This is achieved in that the reference contour at the locations of the tool to be machined is arranged at the smallest distance possible from the three-dimensional tool model that is being detected. To do so, the reference contour and the three-dimensional virtual tool model can be shifted and/or rotated relative to each other, in which case shifting or rotating occurs about one or more axes of a Cartesian coordinate system, for example.

The desired tool contour generated in this manner is subsequently used for machining the tool by removing material. To do so, a machining unit that is material-removing can be activated in such a manner that, on the tool, an actual tool contour that corresponds to the specified desired tool contour is produced.

With the use of this method it is possible, for example to rework damaged or worn tools and to thus keep the removal of material as minimal as possible. As a result of this it can be achieved that expensive tools can be reworked more frequently than was possible until now. Until now, the removal of material during the reworking of a tool was selected rather more generously by an operator experienced in the reworking of tools in order to ensure that, in fact, there will not remain any damaged or worn areas on the tool.

With the use of the method herein it is also possible to machine a tool blank that was produced by an additive manufacturing process, for example by 3D printing or by selective laser melting, in order to maintain a specified geometric configuration. Additive manufacturing processes are frequently not sufficiently precise. It is possible that, at some points of the tool blank, the tolerance and the surface roughness are sufficient; however, for example in the region of cutting edges, clearance surfaces or cutting spaces, a reworking may take place in order to maintain the specified characteristics or tool parameters.

Furthermore, this method can also be used for machining a hard metal tool that has been provided with a coating. Nowadays, when a hard metal tool or a solid carbide tool is coated, only a very thin layer is applied as coating in order to avoid excessive rounding of the cutting edges. With the use of the method, it is possible to apply—to the hard medal core—a coating having any desired thickness, as is required or advantageous for the optimal use of the tool. Subsequently, an actual tool contour can be produced by removing material by machining, said contour corresponding to the desired tool contour.

Furthermore, it is also possible to use the method for machining a manufactured tool that comprises a carrier and at least one cutting plate arranged thereon. The at least one cutting plate is frequently arranged on the carrier by material bonding and may be imprecisely positioned. By means of the method described hereinabove it is possible—in the course of the tool manufacture and after attachment of the at least one cutting plate—to perform a measurement and remove material by machining of the cutting plate in order to correct, if necessary, its characteristics (e.g., position and/or alignment of the cutting edge relative to a reference point on the carrier).

For machining the tool by removing material it is possible to use a machining unit that, for example, comprises a laser and/or a grinding tool and/or an electrical discharge (EDM) tool. In principle, any material-removing tool that is capable of removing material in a targeted, highly precise manner from the tool can be used.

Preferably, the reference contour is shifted and/or rotated and/or scaled at least in one section while the desired tool contour is produced. Consequently, the position of the reference contour can be arranged relative to the three-dimensional virtual tool model, satisfying the marginal condition of the smallest possible removal of material from the tool. In doing so, it may be sufficient to machine only those sections of the reference contour during the production of the desired tool contour which are subsequently machined by removing material by means of the allocated machining program, e.g., the regions of the cutting edges and/or the clearance surfaces and/or the cutting spaces.

It is advantageous if, during the production of the desired tool contour, the maintenance of at least one specified characteristic of the tool is specified as at least one additional marginal condition. For example, one marginal condition can specify the cutting angle and the permissible tolerance range therefor. Analogously thereto, it is also possible to specify all other characteristics and geometric dimensions, respectively, of the tool.

It is advantageous if—during the comparison or the selection of a tool data set matching the three-dimensional virtual tool model—first, the at least one determined model parameter is compared with the at least one tool parameter containing the at least one data set. This requires less computing capacity and it is possible to at least very quickly exclude those tool data sets, wherein at least one model parameter does not match the at least one tool parameter. If the at least one model parameter and the at least one tool parameter correspond, a comparison of the three-dimensional virtual tool model with the reference contour is performed in order to determine whether a match exists.

In modification thereof, it is sufficient—in principle—to compare only the contour of the tool described the three-dimensional virtual tool model with the respective reference contour of the tool data sets. However, this requires greater computing capacities and necessitates more time.

The determination of at least one model parameter with the use of the three-dimensional, virtual tool model can be advantageously performed with the following steps:

Generating and/or selecting a measuring program, wherein the measuring program specifies at least one cutting plane through the virtual tool model, and one measuring task, by means of which the at least one model parameter to be determined can be determined by means of the at least one cutting contour between the at least one cutting plane and the virtual tool model;

Starting the measuring program and determining the at least one model parameter by means of the at least one cutting contour of the at least one tool model in the at least one cutting plane.

Depending on the position of the cutting plane relative to the virtual tool model, there results a cutting contour, for example a longitudinal section, a cross-section or a section extending in any oblique or inclined manner through the tool model. This cutting plane contains a cutting contour of the virtual tool model whose progression is evaluated by the measuring program in order to determine the at least one model parameter. In doing so, one or more model parameters can be determined in each cutting plane. It is also possible to determine a model parameter with the use of several cutting planes or cutting contours.

Model parameters that can be determined are, for example, a cutting angle, a clearance angle, a wedge angle, a number of blades, an angular pitch, a length of the tool, a core diameter, an angle of twist, a corner radius at a cutting edge, or any combination of the aforementioned model parameters.

It is advantageous if, for the generation of the virtual tool model, the tool is first recorded from different directions, preferably in a contactless manner. The thusly obtained measured data generate a dot cloud that, in turn can be directly used as a virtual tool model or, as described hereinabove, be continually processed by algorithms and mathematical processes to generate a virtual tool model.

The method can also be used in a tool that comprises several cutting plates that are arranged on a common carrier. During the manufacture of such a tool, the position—as a rule—cannot be generated with sufficient precision due to the mounting of the cutting plates, for example the material-bonded mounting of the cutting plates, to the carrier. As a result of the method, a material removal at the cutting plates can occur in order to achieve the position of cutting edges, or the alignment of edges or surfaces, relative to a reference axis of the carrier.

Advantageous embodiments of the invention can be inferred from the dependent claims, the description and the drawings. Hereinafter, preferred embodiments of the invention are explained in detail with reference to the appended drawings. They show in

BRIEF DESCRIPTION OF THE DRAWINGS

FIG. 12 an exemplary tool that comprises a carrier, as well as cutting plates, arranged on the carrier; and FIG. 13 a schematic diagram of a cutting plate that is not in the specified position on the tool of FIG. 12, and a schematic diagram of the contact points on a cutting plate that were necessary in conventional methods.

DETAILED DESCRIPTION

Figure 1:
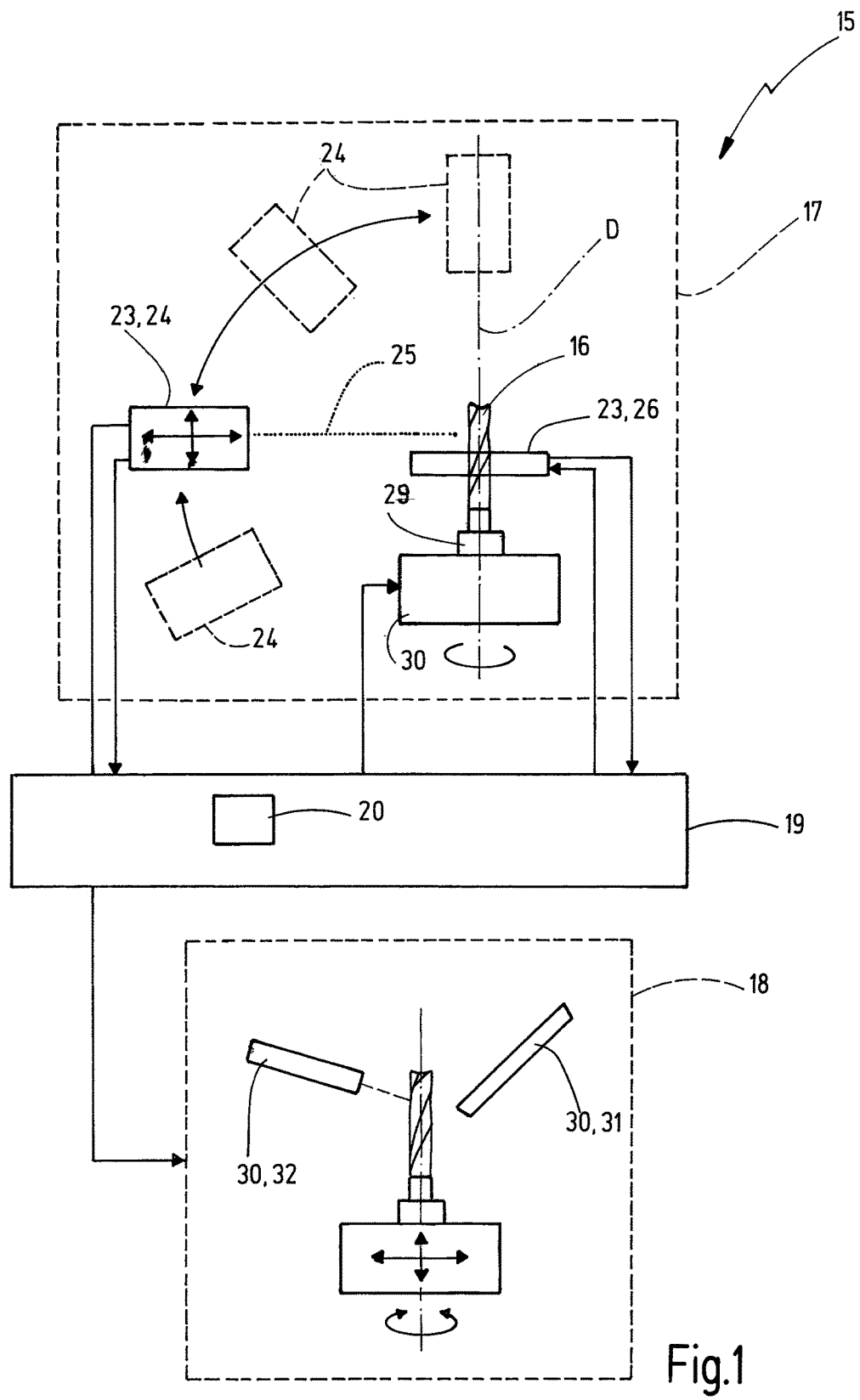
FIG. 1 a block diagram of an exemplary embodiment of a device for machining a tool by removing material.

FIG. 1 shows a schematic diagram in the form of a block diagram of a device 15 for machining a tool 16 by removing material. The tool 16 may be a milling tool, a drilling tool or any other desired tool. The exemplary embodiment is a tool 16 that is driven during its operation so as to rotate about a longitudinal axis. The tool 16 is described by characteristics that are parameters which characterize the tool. For example, the number of blades, the cutting angle, the clearance angle, the angular pitch between blades that are adjacent in circumferential direction about the longitudinal axis of the tool 16, the length of the tool in the direction of its longitudinal axis, the core diameter, the angle of twist, angular momentum or the ratio between core diameter and the orbital trajectory of the tool blades, can be used individually or in any combination. Also, it depends on the type of tool, which characteristics are suitable.

The device 15 comprises a measuring unit 17, a machining unit 18, as well as a control unit 19 that controls the measuring unit 17 and the machining unit 18. In modification of the exemplary embodiment illustrated here, it is also possible to control and spatially separate the measuring unit 18 and the machining unit 17 by means of separate control units. The required data exchange between the control units can take place by known communication means, either in a wireless or a wire-based manner.

The measuring unit 17 comprises at least one measuring device 23. The at least one measuring device 23 of the measuring unit 17 is embodied in such a manner that, with the use of the measuring unit 17, it is possible to detect the three-dimensional outer contour of the tool 16 on the face surface and on all circumferential surfaces.

According to the example, the measuring unit 17 comprises a measuring device 23 in the form of a 3D scanner 24. The 3D scanner 24 that can be used, for example, may be a laser scanner that directs a laser beam 25 onto the tool 16 in order to detect the contour of said tool.

In the exemplary embodiment described here, the measuring unit 17 furthermore comprises another measuring device 23 in the form of a camera 26. The camera 26 may be implemented as a line scan camera or a matrix camera with several lines. For example, the camera 26 may be disposed for generating transmitted light recordings. In that event, an illumination unit is arranged on the side of the tool 16 opposite the camera 26, said illumination unit not being shown to avoid confusion.

According to the example, the tool 16 is arranged in a tool holder 29. The tool holder 29 can be moved relative to the at least one measuring device 23 in order to detect the tool 16. In the exemplary embodiment, the tool holder 29 is arranged so as to be rotatable about an axis of rotation D. The tool holder 29 is associated with a rotary drive 30.

Alternatively or additionally, the at least one measuring device 23 may be positioned relative to the tool holder 29. Referring to the exemplary embodiment described here, the 3D scanner can be positioned relative to the tool holder 29 in order to assess the tool 16 radially with respect to the axis of rotation D and/or obliquely with respect to the axis of rotation D and/or parallel to or in alignment with the axis of rotation D. The possible position options of the 3D scanner are illustrated in FIG. 1 by exemplary positions of the 3D scanner indicated in dashed lines.

Furthermore, the device 15 comprises the machining unit 18 by means of which the tool 16 can be machined by removing material. To do so, the machining unit 18 comprises a machining tool 30. The machining tool 30 may be, for example, a grinding disk 31. It is also possible to machine the tool 16 with the use of a laser 32 or an electrical discharge (EDM) tool. The machining unit 18 may thus be a grinding machine, a laser processing machine, an electrical discharge tool or a combined processing machine.

The measuring unit 17 and—in accordance with the example—the 3D scanner 24 provide measured data in the form of a dot cloud PW. These are transmitted to the control unit 19 or, alternatively, to a machining device of the measuring unit 17 or an external computer. In this case, the measuring unit 17 may have an appropriate interface for data transmission. Furthermore, the control unit 19 comprises a memory unit 20 and/or is connected to an external memory unit 20.

Furthermore, the device 15 may comprise a not illustrated user interface with a display or user desktop. The user interface may feature known user options such as a touch-sensitive image screen, a computer mouse, a keyboard, a touchpad, a control via angles of inclination and/or acceleration sensors or the like. It is also possible to connect the control unit 19 via an interface to one or several external computing and/or memory units in order to increase the computing or memory capacities if necessary, or to import or export data.

Figure 2:
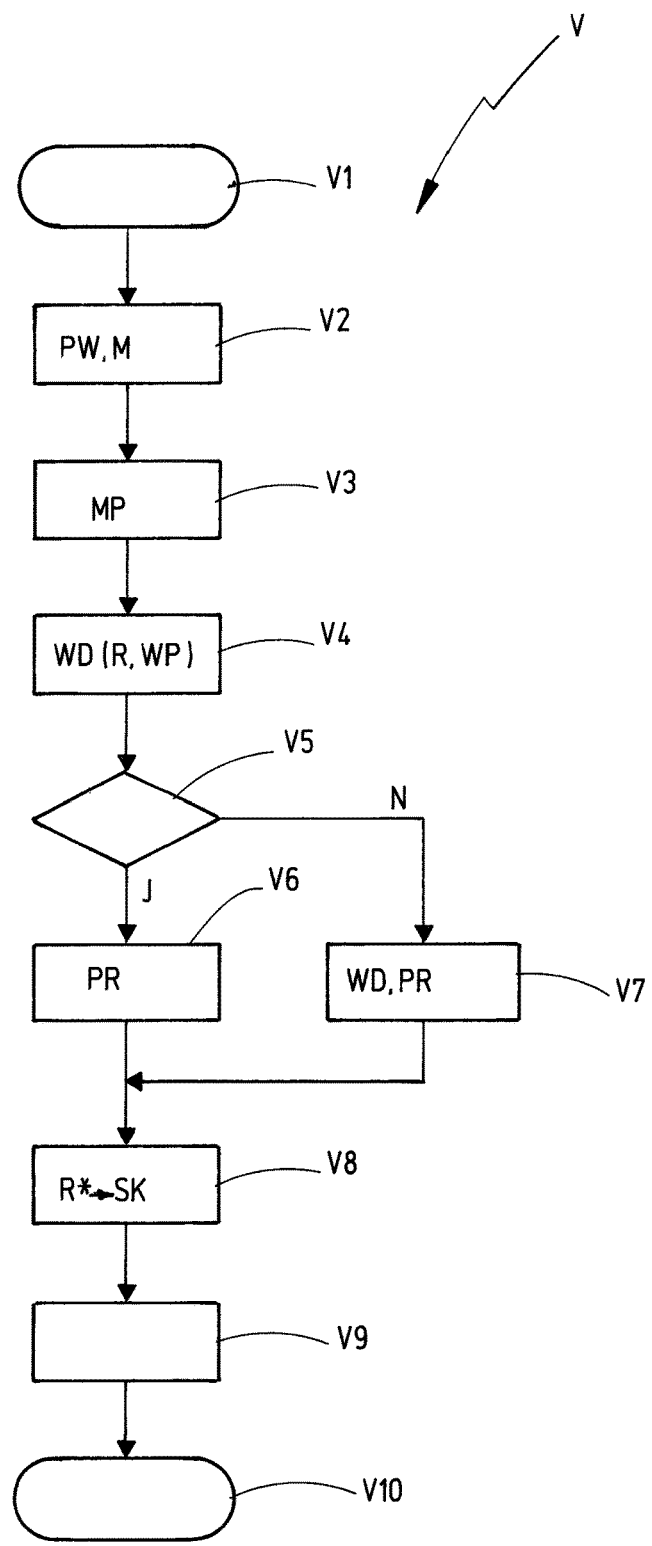
FIG. 2 a flow chart of an exemplary embodiment of a method for machining a tool by removing material.
Figure 4:
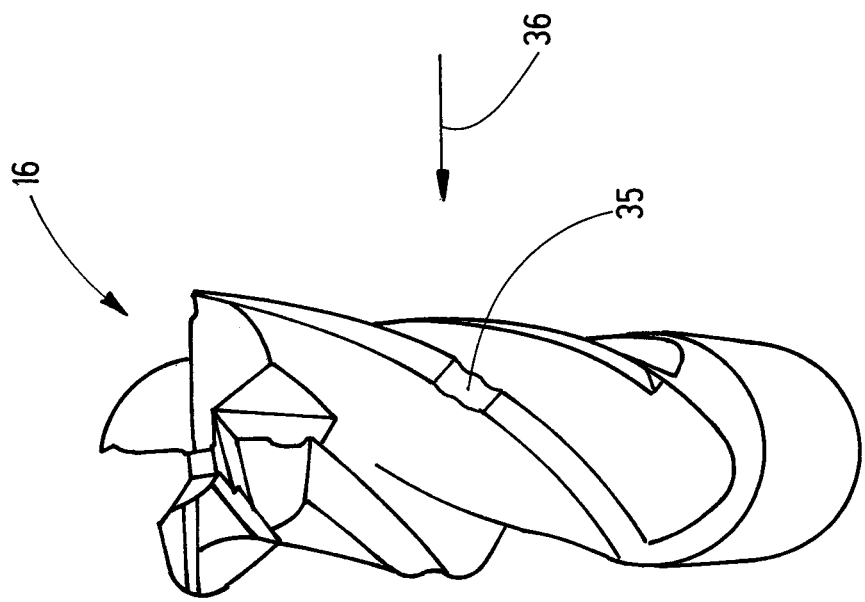
FIG. 4 the tool of FIG. 3 in used, worn condition.
Figure 3:
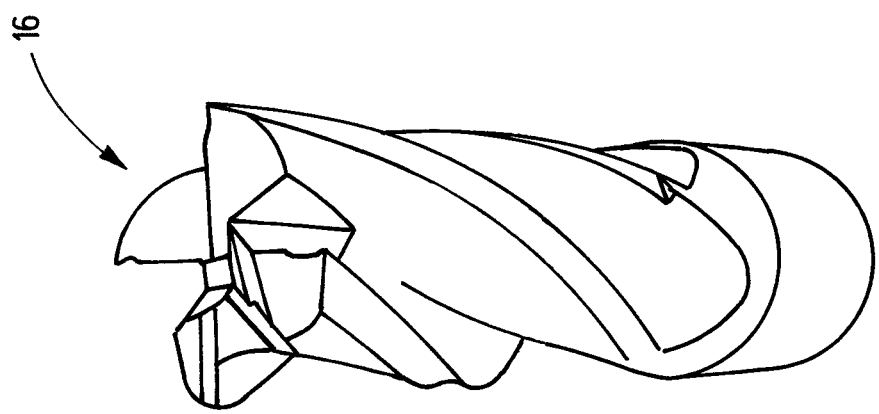
FIG. 3 a perspective representation of an exemplary, non-worn tool.

FIG. 2 shows a flow chart of an exemplary method. The process flow is explained hereinafter with reference to FIGS. 4-8 for the reworking a used, wear-displaying tool 16. FIG. 3 shows the tool 16 in its original, unused condition. FIG. 4 shows—only schematically and not true to scale—the used, damaged tool 16, in which a recess 35 is schematically shown, for example. The used, damaged tool 16 of FIG. 4 is to be reworked with the use of the device 15 and the method V, respectively, in order to eliminate damage such as the recess 35 and to improve the machining results with the use of the tool 16 during use of said tool.

Figure 8:
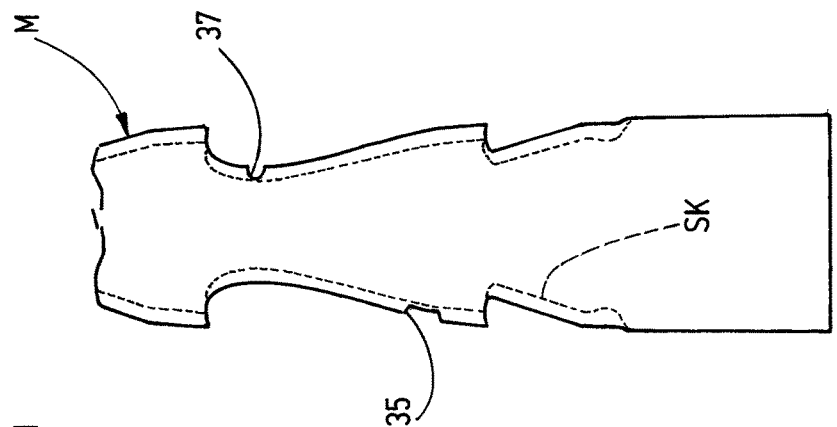
FIGS. 6-8 schematic representations of the reference contour of FIG. 5, as well as a three-dimensional virtual tool model of the tool of FIG. 4 recorded by measured data.
Figure 7:
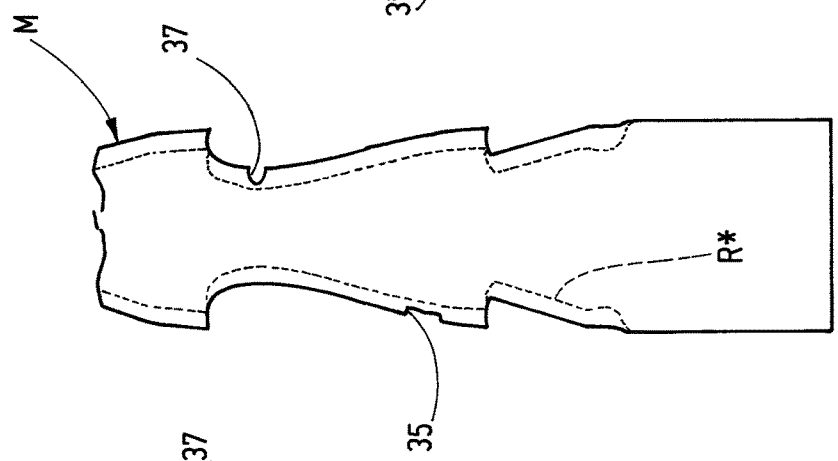
Figure 6:
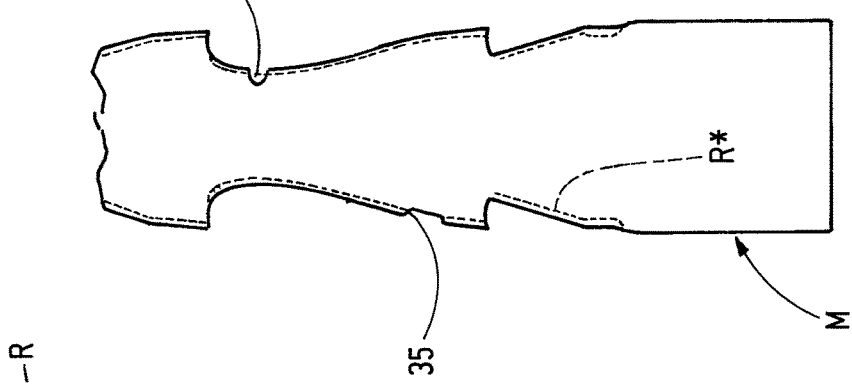
Figure 5:
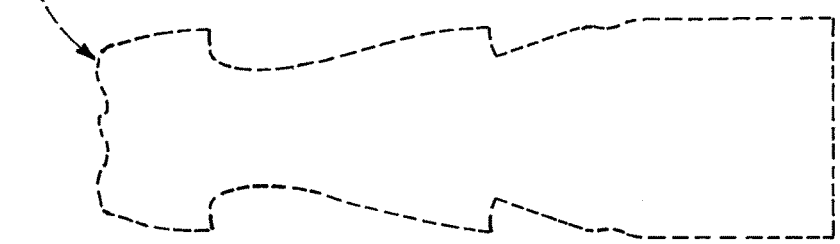
FIG. 5 a schematic representation of a reference contour of a tool data set.

The method V is started with a first method step V1, after the tool 16 has been mounted in the tool holder 29, so that said tool can be measured in three dimensions with the use of the measuring unit 17. During a subsequent, second method step V2, the measured data of the measuring unit 17 are used to generate a three-dimensional tool model M. The three-dimensional, virtual tool model M is illustrated in FIGS. 6-8 in a highly schematic manner as a two-dimensional contour when the virtual tool model M is viewed from a direction consistent with arrow 36 in FIG. 4. In addition to the recess 35, the damaged tool 16 shows, e.g., a notch 37 that is illustrated by the generated three-dimensional virtual tool model M (FIGS. 6-8).

The three-dimensional virtual tool model M is determined based on a dot cloud PW. In the exemplary embodiment, the dot cloud PW is generated by the scan data of the 3D scanner 24. The dot cloud PW can produce the three-dimensional tool model M, directly or after machining. For example, algorithms can eliminate error detection points from the dot cloud PW. Alternatively or additionally, a grid model or a textured model can be produced and used as the virtual tool model M. To do so, known algorithms and mathematical methods may be used.

In the exemplary embodiment, the virtual tool model M is used to determine—in a third method step V3—one or more model parameters MP of the virtual tool model M. Model parameters MP are in particular such measurements or values that act as characteristics in a tool such as, for example, the number of cutting edges, an angular pitch, a cutting angle, a clearance angle, etc. It depends on the type of tool 16 what model parameters MP and what number of model parameters MP are determined during the third method step V3.

The third method step V3 is optional. The method V can also be performed without the determination of a model parameter MP. However, the determination of at least one model parameter MP during the third method step V3 is advantageous because, during the subsequent process flow, less computing time and less computing capacity, respectively, are required.

In order to determine the at least one tool parameter MP during the third method step, preferably a measuring program is selected which sets one or more cutting planes through the virtual tool model M. Respectively one cutting contour is formed in the cutting planes between the cutting plane and the virtual tool model M. With the use of known image processing methods it is possible—by means of one or also more cutting contours—to determine one or more model parameters MP, respectively.

During a fourth method step V4, the virtual tool model M, as well as the at least one model parameter MP, are compared with tool data sets WD stored in a memory unit 20 of the control unit 19 or in a computing unit communicating with the control unit 19. In accordance with the example, each tool data set WD contains a reference contour R, as well as at least one tool parameter WP. Tool parameters WP are one or more characteristics that describe the tool 16. The reference contour R specifies a true-to-scale, ideal contour for the edges and surfaces of the tool 16.

During the fourth method step V4, now the virtual tool model M, as well as the at least one model parameter MP, are compared with the existing tool data sets WD. To accomplish this, the procedure is preferably such that, first, the at least one model parameter MP is compared with the tool parameters WP of the tool data sets WD and checked in view of a match. If, for example, one of the model parameters MP indicates that the detected tool 16 is a tool with four helical cutting edges, it is possible during the comparison with the data sets WD to very quickly find the data sets that relate to a tool with four helical cutting edges. All other tool data sets WD may remain without consideration during further match checking. This comparison can be performed very rapidly and in a time-saving manner. The more precisely the tool is described by the determined model parameters MP and the tool parameters WP contained in the tool data sets WD, the faster it is possible to determine the tool data sets WD relevant for the continued process.

If, in a tool data set WD, all the tool parameters WP correspond to the determined model parameters MP, then—in the exemplary embodiment described here—the reference contour R of the tool data set WD is compared with the virtual tool model M and checked for a match. It is only when the reference contour R and the virtual tool model M also match that a corresponding tool data set WD has been found.

During a fifth method step V5 there is an interrogation as to whether a tool data set WD matching the virtual tool model M and the at least one model parameter MP was found. If this is true, the method V is continued during a sixth method step V6 (branch J of the fifth method step V5). If this is not true, the method V is continued during a seventh method step V7 (branch N of the fifth method step V5).

During the sixth method step V6 a machining program PR is selected. Preferably, each tool data set WD is allocated exactly one machining program. Therefore, by finding a tool data set WD, the selection of the machining program PR occurs already automatically, said machining program being disposed for the control of the machining unit 18 during the reworking of the tool 16.

If no usable data set WD could be found, a corresponding data set WD7 is generated during the seventh method step V7, and a machining program is allocated or also newly generated.

Following the sixth method step V6 or the seventh method step V7, the method V is continued during the eighth method step V8.

During the eighth method step V8, one or more machining parameters of the machining program PR are determined and scheduled. The procedure during the eighth method step V8 is schematically illustrated by FIGS. 6-8. The reference contour R is fitted into the detected virtual tool model M. At this point it should be pointed out again that, despite the only two-dimensional representation in FIGS. 5-8, the reference contour R, as well as the virtual tool model M, are three-dimensional. A two-dimensional representation was selected for explanation in order to improve clarity. The reference contour R is fitted into the virtual tool model M, taking into consideration one or more marginal conditions. In doing so, the reference contour R or a part of this reference contour R is rotated and/or moved relative to the virtual tool model M about one or more axes of a Cartesian coordinate system, for example. Fitting the reference contour R into the virtual tool model M is accomplished in such a manner that the reference contour R is modified by rotation and/or shifting and/or scaling so that a modified reference contour R* results. This modified reference contour R* is positioned inside the virtual tool model M, so that the longitudinal axes of the modified reference contour R* and the virtual tool model M coincide. In the regions of the tool 16 to be machined, the modified reference contour R* does not project from the virtual tool model M. Later, during machining, contact points may exist in the sections of the tool 16 between the modified reference contour R* and the virtual tool model M, wherein cutting points or cutting edges are preferably excluded.

Furthermore, at least one marginal condition is specified, namely that the difference of volume between the virtual tool model M and the modified reference contour R* is to be minimal. This is of importance because, as a result of this, the material to be removed can be minimized. If, during reworking, only as much material as necessary is removed from the tool 16, the number of possible reworking processes of a tool 16 and thus the total useful life can be increased.

In addition to the marginal condition that the material removal is to be minimal, it is also possible to specify additional marginal conditions. For example, it is possible to define in which regions of the reference contour a material removal is possible or necessary. Furthermore, dimensions to be maintained can be specified for specific characteristics, for example for clearance angles, cutting angles, relationships of the core diameter relative to the orbital trajectory of the cutting edges, etc.

Finally, taking into consideration the at least one marginal condition, a modified reference contour R* satisfying all marginal conditions and being arranged at least in the required sections inside the virtual tool model M, this modified reference contour R* represents a desired tool contour SK.

This process is schematically illustrated by FIGS. 6-8. From FIG. 6 it can be inferred that the modified reference contour R* does not meet the condition that it is located inside the virtual tool model M. At the location where the recess 35 and the notch 37 are present on the tool 16, the modified reference contour R* intersects the virtual tool model M and can thus not be used as the desired tool contour SK.

From the schematic illustration according to FIG. 7 it can be inferred that the modified reference contour R* is indeed located inside the virtual tool model M but generates too much removal of material because—between the modified reference contour R* and the recess 35 or the notch 37—there remains an unnecessarily large distance that would lead to an unnecessary material removal.

FIG. 8 shows, schematically, the optimized modified reference contour R* that forms the desired tool contour SK. In that case, any damage 35, 37 is eliminated due to the desired tool contour SK during reworking, while, at the same time, the removal of material is minimized, taking into consideration the optionally existing additional marginal conditions.

After the desired tool contour SK was determined during method step V8, the tool 16 is machined during a ninth method step V9 based on the desired tool contour SK and the machining program PR, so that the actual tool contour of the tool 16 corresponds to the desired tool contour SK—within the framework of the technically possible precision.

Subsequently, the method V is completed during the tenth method step V10.

As an alternative to the method flow of the example in FIG. 2, it is also possible to perform—after the ninth method step V9—a renewed measurement with the measuring unit 17 and to compare the resultant virtual tool model M with the desired contour SK generated during the eighth method step V8 in order to determine deviations. Optionally, a changed desired contour can be calculated therefrom and a renewed machining can be performed with the machining unit 18. As a rule, such an iterative process flow will not be necessary.

Hereinabove, the method V was described as an example for reworking a used tool 16 (FIG. 4). However, the method V is also suitable within the framework of the production of a new tool.

Figure 9:
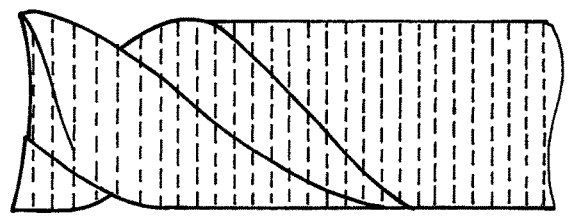
FIG. 9 a schematic side view of a tool fabricated in layers by an additive manufacturing process.

FIG. 9 shows, schematically, in an exemplary manner, a tool 16 that was fabricated by an additive manufacturing process, for example by 3D printing or by selective laser melting in successive layers. Referring to this manufacturing method, the achievable precision is frequently not sufficient to satisfy the specifications of a tool 16. Furthermore, the surface of the thusly fabricated tool 16 is comparatively rough. A tool blank 16 produced in such a manner can be measured and reworked following method V, so that its characteristics and surface qualities satisfy specifications.

Figure 11:
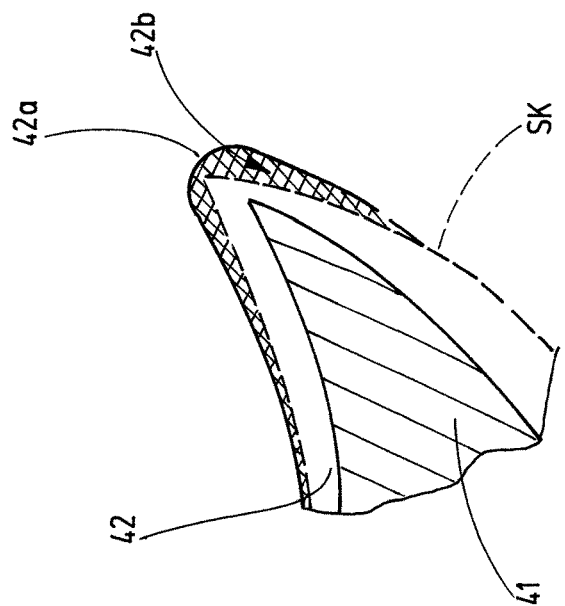
FIG. 11 a depiction of a detail of the region XI in FIG. 10.
Figure 10:
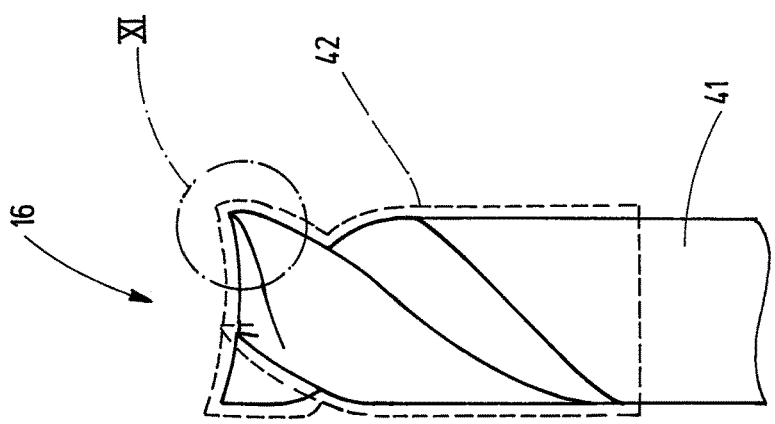
FIG. 10 a schematic side view of a solid carbide tool provided with a coating.

Another option of use is schematically shown by FIGS. 10 and 11. FIG. 10 shows a tool 16 with a solid carbide core 41 and a coating 42 that is applied at least to sections of the solid carbide core 41. Nowadays such coatings have extremely small layer thicknesses of less than 3 µm. This is due to the fact that greater layer thicknesses result in too extreme a rounding of the cutting edges. However, minimal layer thicknesses are inadequate in view of use and the useful life of the tool 16. According to the invention the solid carbide core 41 can be provided with a clearly thicker coating 42, e.g., with a coating 42 having a thickness of up to 30 µm. Indeed, in this case characteristics of the tool 16 are changed and no longer satisfy specifications; however, subsequently the method V described hereinabove is performed, so that the required characteristics are achieved again. For example, edge radii, cutting angles, clearance angles, structures concealed by the coating 42, chip space dimensions, etc., can be exposed or restored again. Consequently, clearly greater layer thicknesses of up to 30 µm can be achieved. Nevertheless, the tool 16 displaying the required characteristics can be manufactured rapidly and efficiently. As schematically shown by FIG. 11, for example, an extreme rounding 42a due to the application of the coating 42 to the solid carbide core 41 is corrected in that a material volume 42b of the coating 42 is removed, so that the contour of the tool at the cutting edge matches the desired contour SK.

FIGS. 12 and 13 show another exemplary embodiment during the new manufacture of a tool 16. In this case, a tool 16 with a carrier 43 with at least one cutting plate 44 arranged on the carrier 43 is shown. Frequently, the cutting plates 44 are material-bonded to the carrier 43, for example by soldering. In doing so, the required position of the cutting plates 44 is not achieved exactly in some cases. In FIG. 13 the desired position 44s of a cutting plate is schematically indicated in dashed lines. During material-bonded attachment, in particular by soldering, the cutting plate 44 is deformed and adopts the actual position 44i. During soldering, it is possible—in addition to positional deviations in one or more spatial directions—for contour deviations to occur on the radially outer contour of the cutting plate as a result of soldering the cutting plate 44 to the carrier 43. The cutting plate may bend, as a result of which also the radially outer edge that defines the removal of the material from the tool is imparted with a curvature.

In the case of tools having multiple blades—especially long blades (such as are shown, for example, by FIG. 12)—a plurality of sensing points 45 along the blade of the cutting plate 44 was required until now in order to be able to measure plate warping (curvature of the cutting plate 44) caused by the soldering process. This was performed in the machining unit and took a very long time; the machining unit is unproductive during this time. On account of the invention, it is possible to massively reduce the machining time in the machining unit 18 (EDM and/or grinding and/or laser machining), because the plate seat measurements and, optionally, also the compensation calculations can be performed separately in the measuring unit 17. The three-dimensional measurement and the determination of the desired contour SK can be performed in advance by the measuring unit 17, and the data can be passed with the tool 16 to the machining unit 18. Due to a measurement in advance and, optionally, already the determination of the machining data for the generation of an actual contour matching the desired contour SK, it is possible to make the machining process more efficient. The 3D scanning of the blades or the cutting plates 44 is substantially more efficient than the contacting of individual sensing points 45. In addition, it is also ideally possible by 3D scanning to accurately determine the material allowance of the cutting plates 44 relative to the desired contour SK. This is highly complex with touch contact only, in particular in the case of contour progressions.

By means of method V described hereinabove it is possible to measure the carrier 43 loaded with cutting plates 44 in three dimensions and to generate a virtual tool model M. Subsequently, the cutting plats 44 can be reworked, if necessary, so that the characteristics of the tool 16 are maintained.

The invention relates to a device 15 and a method V for machining a tool 16 by removing material. The tool 16 is first of all measured in three dimensions using a measuring unit 17, and a three-dimensional virtual tool model M is produced therefrom. This virtual tool model M is compared with a reference contour R from a particular tool data record WD. If a match was determined, a machining program PR assigned to the tool data record WD is selected and a desired contour SK is determined by fitting the reference contour R into the three-dimensional virtual tool model M. The tool 16 can then be machined on the basis of this desired contour SK.

LIST OF REFERENCE SIGNS

15 Device
15 Tool
17 Measuring unit
18 Machining unit
19 Control unit
20 Memory unit
23 Measuring device
24 3D scanner
25 Laser beam
26 Camera
29 Tool holder
30 Machining tool, rotary drive
31 Grinding disk
32 Laser
35 Recess
36 Arrow
37 Notch
40 Layer
41 Solid hard metal core
42 Coating
52a Rounded region
42b Material volume
43 Carrier
44 Cutting plate
44i Actual position of the cutting plate
44s Desired position of the cutting plate
45
AW Axis angle position
D Axis of rotation
M Three-dimensional virtual tool model
MP Model parameter
R Reference contour
SK Desired tool contour
V Method
V1 First step
V2 Second step
V3 Third step
V4 Fourth step
V5 Fifth step
V6 Sixth step
V7 Seventh step
V8 Eighth step
V9 Ninth step
V10 Tenth step
WD Tool data record
WP Tool parameter

The invention claimed is:

1. Method (V) for machining a tool (16) by removing material, the method comprising:
Performing a measurement of the tool (16) in three dimensions and generating a three-dimensional virtual tool model (M) based on the measured data of the three-dimensional measurement;
Providing several tool data sets (WD) respectively having one or both of one reference contour (R) of the tool (16) and at least one tool parameter (WP) corresponding to one characteristic of the tool (16), wherein each of the tool data sets (WD) is allocated respectively to one machining program (PR);
one or both of comparing the three-dimensional virtual tool model (M) with the reference contour (R) and comparing at least one model parameter (MP) —determined as a function of the virtual tool model (M) and corresponding to a characteristic of the tool (16) —with the tool parameter (WP) of a stored tool data set (WD) of the several tool data sets (WD);
Selecting, based on the comparing, a selected tool data set (WD) of the several tool data sets (WD) corresponding to the three-dimensional tool model (M) and/or the at least one model parameter (MP), or generating and selecting a generated tool data set (WD) corresponding to the three-dimensional virtual tool model (M) and or the at least one model parameter (MP);
Generating a desired tool contour (SK) by fitting a reference contour (R) determined based on the selected or the generated tool data set (WD) or contained in the selected or the generated tool data set (WD) into the three-dimensional virtual tool model (M) under a marginal condition that removal of material is as minimal as possible,
wherein fitting the reference contour (R) into the virtual tool model (M) is accomplished by modifying the reference contour (R) by one or any combination of rotation, shifting, and scaling to create a modified reference contour (R*),
wherein the modified reference contour (R*) is positioned inside the virtual tool model (M) so that the longitudinal axes of the modified reference contour (R*) and the virtual tool model (M) coincide, and
wherein the modified reference contour (R*) does not project from the virtual tool model (M) in the regions of the tool (16) to be machined;
Machining of the tool (16) by removing material for producing an actual tool contour corresponding to the desired tool contour (SK).

2. Method according to claim 1, wherein the machining comprises reworking a worn or damaged cutting tool (16).

3. Method according to claim 1, wherein the machining comprises machining a tool blank produced by an additive manufacturing process.

4. Method according to claim 1, wherein the machining comprises machining a solid carbide tool provided with a coating (42).

5. Method according to claim 1, wherein the machining comprises machining a tool (16) comprising a carrier (43) and at least one cutting blade (44) arranged on the carrier (43).

6. Method according to claim 5, further comprising correcting a course of a radially outer edge of one or more of the cutting blades (44) by the machining as a function of the desired contour (SK).

7. Method according to claim 1,
wherein, during the comparing the three-dimensional virtual tool model (M) with the tool data set (WD), performing a shift and/or rotation of the reference contour (R) about at least one axis of a coordinate system relative to the virtual tool model (M).

8. Method according to claim 1,
wherein, during the generation of the desired tool contour (SK), the reference contour (R) is shifted and/or rotated and/or scaled at least in one or more sections.

9. Method according to claim 1, wherein, during the generation of the desired tool contour (SK), maintenance of at least one specified characteristic is specified for the tool as at least one additional marginal condition.

10. Method according to claim 1, wherein a difference between the desired tool contour (SK) and the three-dimensional virtual tool model (M) describes a volume of material to be removed by the machining.

11. Method according to claim 1, wherein each of the several tool data sets (WD) comprises a reference contour (R) as well as at least one tool parameter (WP).

12. Method according to claim 11, wherein, during the comparison before the selection of the selected or the generated tool data set (WD), first comparing the at least one model parameter (MP) with the at least one tool parameter (WP), and performing a comparison of the three-dimensional virtual tool model (M) with the reference contour (R) only for those tool data sets (WD) in which the at least one model parameter (MP) matches the at least one tool parameter (WD).

13. Method according to claim 1,
further comprising determining the at least one model parameter (MP) using the three-dimensional tool model (WD) by:
Generating and/or selecting a measuring program, wherein the measuring program specifies at least one cutting plane through the virtual tool model (M), and one measuring task, by which the at least one model parameter (MP) to be determined can be determined using the at least one cutting contour between the at least cutting plane and the three-dimensional virtual tool model (M);
Starting the measuring program and determining the at least one model parameter (MP) using the at least one cutting contour of the three-dimensional virtual tool model (M) in the at least one cutting plane.

14. Method according to claim 13, wherein determining the model parameter (MP) comprises determining one or more of: a cutting angle, a clearance angle, a wedge angle, a number of blades, an angular pitch, a length of the tool, a core diameter, an angle of twist, or a corner radius at a cutting edge.

15. Method according to claim 1,
wherein the generating the three-dimensional virtual tool model (M) comprises:
Assessing the tool (16) from several directions and generating measured data in a form of a dot cloud (PW);
Generating the three-dimensional virtual tool model (M) of the tool (16) based on the tool cloud (PW).

16. Device (15) for machining a tool (16) by removing material, the device comprising:
a machining unit (18) that is disposed to machine the tool (16) by removing material,
at least one measuring device (23) that is disposed to generate measuring data to generate a three-dimensional virtual tool model (M) of the tool (16),
a memory unit (20) in which several tool data sets (WD) are stored, individual ones of which include one or both of a reference contour (R) of the tool (16) and at least one tool parameter (WP) corresponding to a characteristic of the tool (16), wherein each tool data set (WD) is allocated respectively one machining program (PR), and
a control unit (19) which is disposed to perform or control steps comprising:
Performing a measurement of the tool (16) in three dimensions using the at least one measuring device (23) to create measured data,
Generating a three-dimensional virtual tool model (M) of the tool (16) based on the measured data of the measuring device (23);
one or both of comparing the three-dimensional virtual tool model (M) with the respective reference contour (R) and comparing at least one model parameter (MP) —determined as a function of the virtual tool model (M) and corresponding to a characteristic of the tool (16) —with the respective tool parameter (WP) of a stored tool data set (WD);
Selecting, based on the comparing, a selected tool data set (WD) of the several tool data sets (WD) corresponding to the three-dimensional tool model (M) and/or the at least one model parameter (MP), or generating and selecting a generated tool data set (WD) corresponding to the three-dimensional virtual tool model (M) and or the at least one model parameter (MP);
Generating a desired tool contour (SK) by fitting a reference contour (R) determined based on the selected or the generated tool data set (WD) or contained in the selected or the generated tool data set (WD) into the three-dimensional virtual tool model (M) under a marginal condition that removal of material is as minimal as possible,
wherein fitting the reference contour (R) into the virtual tool model (M) is accomplished by modifying the reference contour (R) by one or any combination of rotation, shifting, and scaling to create a modified reference contour (R*),
wherein the modified reference contour (R*) is positioned inside the virtual tool model (M) so that the longitudinal axes of the modified reference contour (R*) and the virtual tool model (M) coincide, and
wherein the modified reference contour (R*) does not project from the virtual tool model (M) in the regions of the tool (16) to be machined;
Machining of the tool (16) by removing material for producing an actual tool contour corresponding to the desired tool contour (SK).

* * * * *